(12) United States Patent
Zhong

(10) Patent No.: US 9,547,999 B2
(45) Date of Patent: Jan. 17, 2017

(54) MULTI-FUNCTIONAL CHOPSTICKS FOR CHILDREN

(71) Applicant: Zhuanjia Zhong, Dongguan (CN)

(72) Inventor: Zhuanjia Zhong, Dongguan (CN)

(*) Notice: Subject to any disclaimer, the term of this patent is extended or adjusted under 35 U.S.C. 154(b) by 0 days.

(21) Appl. No.: 15/068,574

(22) Filed: Mar. 12, 2016

(65) Prior Publication Data

US 2016/0343267 A1 Nov. 24, 2016

(30) Foreign Application Priority Data

May 19, 2015 (CN) .......................... 2015 1 0255420

(51) Int. Cl.
*B66F 19/00* (2006.01)
*G09B 19/00* (2006.01)
*A47G 21/06* (2006.01)

(52) U.S. Cl.
CPC ............ *G09B 19/00* (2013.01); *A47G 21/103* (2013.01); *G09B 19/0092* (2013.01)

(58) Field of Classification Search
CPC .... A47G 21/004; A47G 21/103; B25J 13/082; G09B 19/0092; G09B 5/02; G09B 19/00; G06K 9/00597; G06K 9/72; H04N 5/2253; H04N 5/23293; G06F 3/005

USPC ................................................. 294/218, 907
See application file for complete search history.

(56) References Cited

FOREIGN PATENT DOCUMENTS

CN          203106643 U    *  8/2013
CN          204049103 U    * 12/2014

* cited by examiner

*Primary Examiner* — Stephen Vu
(74) *Attorney, Agent, or Firm* — Timothy Wang; Ni, Wang & Massand, PLLC

(57) ABSTRACT

The multifunctional chopsticks comprise an intelligent control device having a sensor module, a pressure induction module, a timing module, a voice module, a communication module and a power module; the sensor module is arranged at one end of the chopstick body and connected with the timing module, the pressure induction module is arranged on the middle upper portion of the chopstick body and also connected with the timing module; the voice module, the communication module and the power module are arranged at the other end of the chopstick body; the voice module is connected with the sensor module, the timing module and the pressure induction module; and the voice module is connected with the communication module and the power module. The pair of multifunctional chopsticks for children can help the children to use the chopsticks correctly, enables parents to learn about the children's dining habits and obtain specific food information.

7 Claims, 1 Drawing Sheet

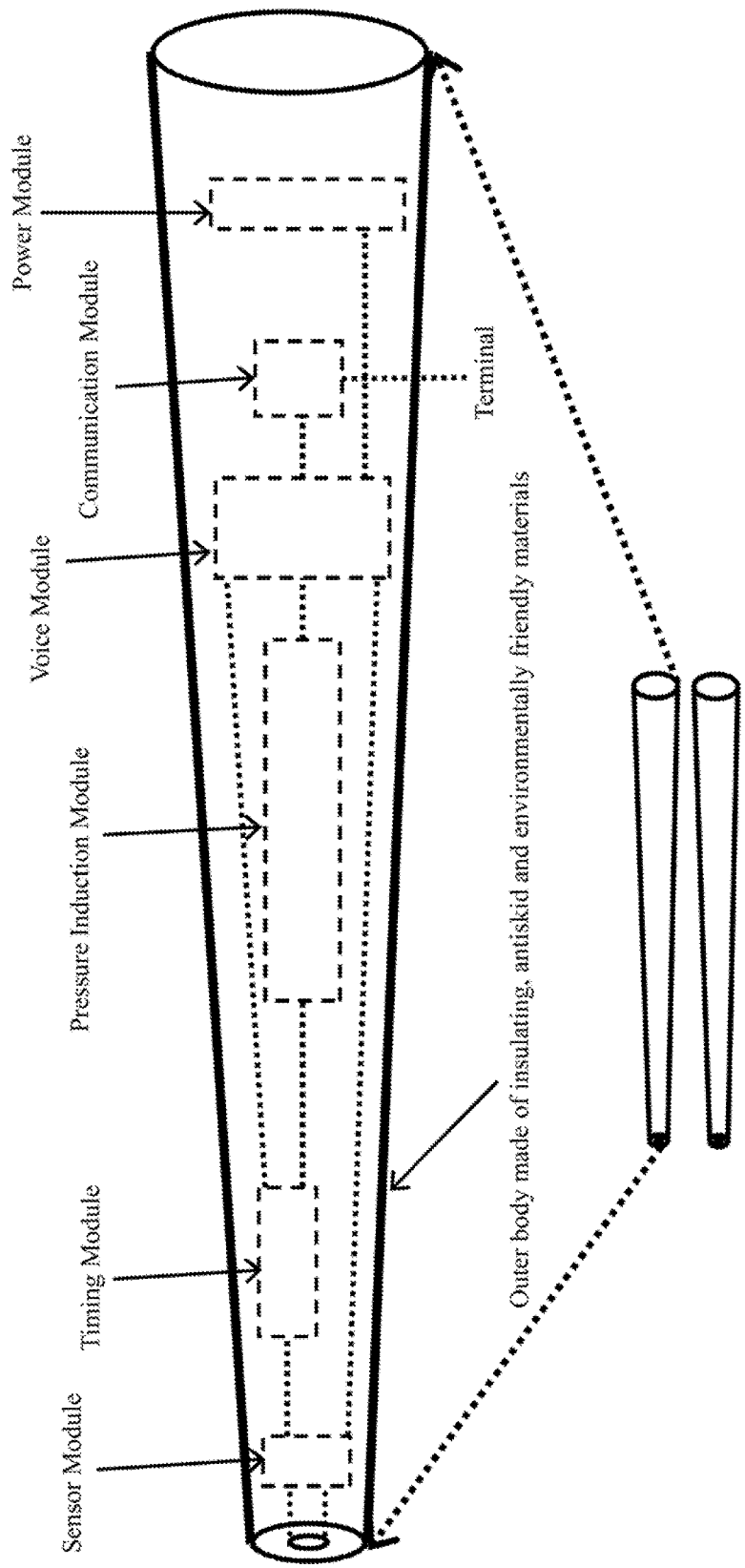

MULTI-FUNCTIONAL CHOPSTICKS FOR CHILDREN

TECHNICAL FIELD

The instant disclosure relates generally to the technical field of tableware. More particularly, this disclosure relates to a pair of multi-functional chopsticks for children.

BACKGROUND

Existing chopsticks on current market only have a single function. There are no other functions in addition to pick up food. Parents tend to repeat teaching their children how to use chopsticks properly during mealtime, while since children cannot concentrate and they always focus on some other things during mealtime, the mealtime length could be very long, or children may not like eating because they don't think eating is an interesting thing to do, which has no benefit to children's health, and also increases the burden on parents. In addition, parents usually add salt, sugar, oil, and other seasoning during cooking based on their personal experience, but may not be well informed of the specific food information, or know about children's dining status in details.

SUMMARY

To overcome the existing problems of chopsticks in the prior art, such as single function, incapability of getting food information or learning children's eating habits, a lack of fun, the instant disclosure provides a type of multifunctional chopsticks for children, which can help children to use chopsticks in a correct way, let parents learn their children's eating habits as early as possible, and arouse children's interest in eating with the fun voice feature.

A type of children's multi-functional chopsticks comprise a chopsticks body and an intelligent control apparatus, wherein: the chopsticks body is a hollow body, the intelligent control apparatus is built into the chopstick body; the intelligent control apparatus includes a sensor module, a pressure induction module, a timing module, a voice module, a communication module, and a power module; the sensor module is located at one end of the chopstick body and connected to the timing module; the pressure induction module is located in the middle or upper part of the chopsticks body and connected to the timing module; the voice module, communication module and power module are located at the other end of the chopstick body; the voice module is connected to the sensor module, timing module and pressure induction module; the voice module is connected to the communication module and power module; the sensor module is used to detect information of food, send meal began signal to the timing module and voice module after receiving the food information, and send the food information to the communication module; the timing module starts a timer after receiving the meal began signal and stops the timer after receiving meal stop signal, then calculates and saves the length of mealtime, while sending the mealtime information to the communication module; the pressure induction module is used to detect user's hand pressure and force area information of the chopsticks body, and control the power module; the voice module sends out voice reminder information, which is pre-stored in the voice module, and at the same time makes statistics on how many times it receives the reminder information, then saves the statistics result, and send it to the communication module; the communication module receives the food information, meal time information and statistics result of reminder signals, then send the food information, meal time information and statistics result of reminder signals to a terminal.

The sensor module comprises a temperature sensor, salinity sensors, and a sugar content sensor. The temperature sensor is preset with a low-temperature threshold and a high-temperature threshold. The salinity sensor is preset with a salinity threshold. The sugar content sensor is preset with a sugar content threshold. The temperature sensor sends low-temperature or high-temperature alert signal to the voice module when it detects the temperature of food is lower than the low-temperature threshold or higher than the high-temperature threshold. The salinity sensors and sugar content sensor send a salinity or sugar content alert signal to the voice module when the sensor detects the salinity and sugar content contained in the food exceed the salinity threshold and sugar content threshold respectively.

The pressure induction module comprises a plurality of pressure sensors, and is preset with a pressure threshold, a force area threshold, response time of closed circuit, response time of open circuit, and meal stop response time. The meal stop response time is less than the response time of open circuit. The pressure induction module sends a close circuit signal to the power control module when it detects a pressure higher than the pressure threshold with a duration exceeding the response time of closed circuit, sends a meal stop signal to the timing module when it detects a pressure lower than the pressure threshold with a duration exceeding the meal stop response time, sends an open circuit signal to the power module when the response time of open circuit is exceeded, and sends a grip posture reminder signal to the voice module when the force area of the chopsticks body is lower than the force area threshold. The timing module is preset with a mealtime range. If the mealtime length exceeds the mealtime range and the meal stop signal has not been received, the timing module will send a mealtime overlong reminder to the voice module. If the mealtime length is less than the mealtime range, the timing module will send an inadequate mealtime reminder signal to the voice module. If the mealtime length is within the mealtime range, a signal of appropriate mealtime will be sent to the voice module.

The voice module receives reminder signals for meal began, low temperature, high temperature, salinity, sugar content, grip posture, overlong mealtime, inadequate mealtime or appropriate mealtime, and sends out corresponding voice reminders for meal began, low temperature, high temperature, salinity, sugar content, grip posture, overlong mealtime, inadequate mealtime or appropriate mealtime.

The communication module and the terminal are connected via Bluetooth or Wi-Fi.

The power module receives the close circuit signal and open circuit signal to close or open the circuit.

The power module is a rechargeable power supply.

The chopsticks body is provided with holes at one end of it for the sensor module to contact with the food.

The chopsticks body utilizes insulating, antiskid, and environmentally friendly materials.

The instant disclosure may provide a children's multi-functional chopsticks, which can help children to use chopsticks correctly, letting parents know about children's eating habits as early as possible, provide with voice function, send out voice reminders when children use chopsticks incorrectly or when temperature, salinity and sugar content is too high, and prevent burns; a verbal encouragement message will be sent out when children use chopsticks properly, or mealtime length is appropriate, etc.; arouse children's interest in eating and control children's mealtime with the fun features; and the food information can be sent to the terminal in parents' side, so that parents can have better knowledge about their children's eating habits, adjust recipes and quantity of salt and sugar timely to ensure that children can eat healthily.

BRIEF DESCRIPTION OF THE DRAWINGS

FIG. 1 is a schematic illustration of the intelligent control apparatus in the children's multi-functional chopsticks in accordance with an embodiment of the disclosure.

DETAILED DESCRIPTION OF THE PREFERRED EMBODIMENT

The instant disclosure will now be described in greater detail in conjunction with the accompanying drawing and the following embodiments. It should be understood that the specific embodiments described herein are only intended to explain the disclosure and are not intended to limit the disclosure.

According to the instant disclosure, a type of children's multifunctional chopsticks comprises a chopsticks body and an intelligent control device, wherein the chopsticks body is a hollow body, the intelligent control device is built into the chopsticks body, and the chopsticks body uses insulating, antiskid, and environmentally friendly materials.

As shown in FIG. 1, the intelligent control apparatus comprises a sensor module, a pressure induction module, a timing module, a voice module, a communication module, and a power module. The sensor module is located at one end of the chopsticks body and connected with the timing module. The pressure induction module is located in the middle or upper part of the chopsticks body, and also connected to the timing module. The voice module, communication module and power module are located at the other end of the chopstick body. The voice module is connected to the sensor module, the timing module and the pressure induction modules. The voice module and the communication module are connected to the power module.

The chopsticks body is provided with holes at one end of the body for the sensor module to contact with food. The sensor module is in contact with food through the holes to detect food information. It sends meal began signal to the timing module and voice module after obtaining food information, and sends the food information to the communication module. That is, a timing signal is sent to the timing module when the user begins to touch food with chopsticks, and mealtime length is calculated.

The sensor module comprises a temperature sensor, salinity sensors, and a sugar content sensor to detect food temperature, salinity, and sugar content of food, which can prevent hurting child due to overheated food. The temperature sensor is preset with a low-temperature threshold and a high-temperature threshold. The salinity sensor is preset with a salinity threshold. The sugar content sensor is preset with a sugar content threshold. When the temperature sensor detects the temperature of food is lower than the low-temperature threshold or above the high-temperature threshold, it will send a low-temperature or high-temperature reminder signal to the voice module. The salinity sensor and sugar content sensor detect salinity and sugar content of food, and send a salinity or sugar content alert signal to the voice module when the salinity or sugar content of the food exceeds the salinity threshold value or sugar content threshold respectively.

The pressure induction module is located in the middle or upper portion of the chopsticks body, including a plurality of pressure sensors to detect hand pressure from users and force area information of the chopsticks body, and control the power module with a preset pressure threshold, a force area threshold, response time of closed circuit, response time of open circuit, and meal stop response time, wherein the meal stop response time is less than the response time of open circuit. When the pressure induction module detects that a pressure is higher than the pressure threshold with a duration longer than the response time of closed circuit, it sends a close circuit signal to the power control module. When the pressure induction module detects that a pressure is lower than the pressure threshold with a duration longer than the meal stop response time, it will send a meal stop signal to the timing module. If the response time of open circuit is exceeded, it sends an open circuit signal to the power module. When the force area of chopsticks body is less than the force area threshold, indicating that the user does not use the chopsticks correctly, who may hold the chopsticks too high or too low, or the gripping posture is incorrect, it will send a grip posture reminder signal to the voice module to remind the user to change grip posture, which can help children to develop the habit of using chopsticks correctly.

The power module receives closed circuit signal and open circuit signal to close or open the circuit, and the power module is a rechargeable power supply. This kind of setting can not only save energy, but also avoid the need to add a switch module. When a user picks up the chopsticks, the circuit will be closed and the module will begin to work. When the user lays down his or her chopsticks, the pressure information will not be detected, and thus a meal stop signal will be sent to the timing module, and then after a period of time the circuit will be automatically broken, which is very easy to use.

The timing module starts timer after receiving the meal began signal, stops the timer after receiving the meal stop signal, calculates and saves the mealtime length, and transmit the mealtime information to the communication module. The timing module is preset with a mealtime range. If the mealtime length exceeds the mealtime range and a meal stop signal has not been received, at this time, the timing module will send a mealtime overlong reminder signal to the voice module; if the mealtime length is less than the mealtime range, it will send a mealtime inadequate reminder to the voice module; if the final time measured is within the mealtime range, it will send a mealtime appropriate signals to the voice module.

The voice module receives reminder signals for meal began, low temperature, high temperature, salinity, sugar content, grip posture, overlong mealtime, inadequate mealtime, and appropriate meal time; and issues corresponding voice reminders for meal began, low temperature, high temperature, salinity, sugar content, grip posture, overlong mealtime, inadequate mealtime, and appropriate mealtime. For example, when receiving a meal began signal, the voice module will send a voice message like "Time to eat!" if the temperature, salinity, or sugar content is inappropriate, it will issue voice messages like "The food is too hot. Wait a moment to eat!", "The food is too cold. Be careful!", "Too salty!", or "Too sweet!" if the meal duration is too long, it will issue voice messages like "You eat too slow"; if the meal duration is not enough, the voice message would be like "You eat too fast."; if the meal duration is within the mealtime range, it will issue voice messages like "You are awesome. Keep up the good work"; if the gripping posture is incorrect, then it will issue a voice message such as "posture is incorrect. Try again." The above voice reminder messages are preset in the voice module, and will be issued correspondingly based on children's dining status during the process of using the chopsticks in accordance with disclosure. The voice information is specially designed for children, which is easy to be accepted by children and makes them feel interesting during dining. When children make proper use of the chopsticks, an encourage voice message will be issued, which will reinforce children's awareness of using chopsticks in their dining, control children's meal time in a more reasonable range, reduce the situation of overlong mealtime or unwillingness to eat, and if children start to practice using chopsticks in their earlier age, it can also help children's intellectual development.

The voice module can also make statistics on how many times it receives the reminder information, save the statistics result, and send it to the communication module. The communication module receives food information, mealtime information and statistics result of reminder signals, then sends the food information, mealtime information and statistics result of reminder signals to a terminal. The communication module and the terminal are connected via Bluetooth or Wi-Fi. Parents can view children's eating status in a terminal, as well as learning the specific information of food, so that the recipes and quantity of salt and sugar can be adjusted timely to ensure that children can eat healthily.

The above description is shown and described a preferred embodiment of the disclosure. As described above, it should be understood that the disclosure is not limited to the form disclosed herein and should not be considered to exclude other embodiments, but may be used for a variety of other combinations, modifications, and environments, and can be changed within what is conceived in the scope of the disclosure as described herein, with the above teachings or skill or knowledge learned in related fields. Modifications and variations undertaken by those skilled in the art without departing from the spirit and scope of the instant disclosure should be within the scope of the appended claims.

What is claimed is:

1. A multi-functional chopsticks, comprising:
a chopsticks body and an intelligent control apparatus;
said chopsticks body is a hollow body, and said intelligent control apparatus is built into said chopstick body;
wherein said intelligent control apparatus includes a sensor module, a pressure induction module, a timing module, a voice module, a communication module, and a power module;
said sensor module is located at one end of said chopstick body, and connected to the timing module;
said pressure induction module is located in the middle part of said chopsticks body, and connected to the timing module;
said voice module, communication module and power module are located at the other end of said chopstick body;
said voice module is connected to said sensor module, timing module and pressure induction module;
said voice module is connected to said communication module and power module;
said sensor module is used to detect food information, send meal began signal to said timing module and voice module after receiving said food information, and send said food information to said communication module;
said timing module starts a timer after receiving said meal began signal and stops the timer after receiving the meal ended signal, then calculates and saves the length of mealtime, while sending said mealtime information to said communication module;
said pressure induction module is used to detect user's hand pressure and force area information of said chopsticks body, and control the power module;
said voice module sends out voice reminder information, wherein said voice reminder information is pre-stored in said voice module, and at the same time said voice module makes statistics on how many times it receives the reminder information, then saves the statistics result, and sends it to said communication module;
said communication module receives said food information, meal time information and statistics result of reminder signals, then sends said food information, meal time information and statistics result of reminder signals to a terminal;
said sensor module comprises a temperature sensor, salinity sensors, and a sugar content sensor; said temperature sensor is preset with a low-temperature threshold and a high-temperature threshold; said salinity sensor is preset with a salinity threshold;
said sugar content sensor is preset with a sugar content threshold;
said temperature sensor sends low-temperature or high-temperature alert signal to said voice module when it detects the temperature of food is lower than said low-temperature threshold or higher than said high-temperature threshold; said salinity sensors and sugar content sensor send a salinity or sugar content alert signal to said voice module when the sensor detects the salinity and sugar content contained in the food exceed said salinity threshold and sugar content threshold respectively;
said pressure induction module comprises a plurality of pressure sensors, with a preset pressure threshold, a force area threshold, response time of closed circuit, response time of open circuit, and meal stop response time; said meal stop response time is less than the response time of open circuit; said pressure induction module sends a close circuit signal to said power control module when it detects a pressure higher than the pressure threshold with a duration exceeding said response time of closed circuit, sends a meal stop signal to said timing module when it detects a pressure lower than said pressure threshold with a duration exceeding said meal stop response time, sends an open circuit signal to the power module when said response time of open circuit is exceeded, and sends a grip posture reminder signal to said voice module when said force area of the chopsticks body is lower than said force area threshold.

2. The multi-functional chopsticks as in claim 1, wherein:
said timing module is preset with a
mealtime range; if said mealtime length exceeds said mealtime range and said meal stop signal has not been received, said timing module will send a mealtime overlong reminder to the voice module; if said mealtime length is less than said mealtime range, said timing module will send an inadequate mealtime reminder signal to said voice module; if said mealtime length is within said mealtime range, a signal of appropriate mealtime will be sent to said voice module.

3. The multi-functional chopsticks as in claim 2, wherein: said voice module receives reminder
signals for meal began, low temperature, high temperature, salinity, sugar content, grip posture, overlong mealtime, inadequate mealtime or appropriate mealtime, and issues corresponding voice reminders for meal began, low temperature, high temperature, salinity, sugar content, grip posture, overlong mealtime, inadequate mealtime or appropriate mealtime.

4. The multi-functional chopsticks as in claim 1, wherein: said power module receives said close circuit signal and open circuit signal to close or open the circuit.

5. The multi-functional chopsticks as in claim 4, wherein: said power module is a rechargeable power supply.

6. The multi-functional chopsticks as in claim 5, wherein: the chopsticks body is provided with holes at one end of it for the sensor module to contact with said food.

7. The multi-functional chopsticks as in claim 6, wherein: said chopsticks body utilizes insulating, antiskid, and environmentally friendly materials.

* * * * *